(12) United States Patent
Fitzpatrick et al.

(10) Patent No.: US 9,256,117 B2
(45) Date of Patent: Feb. 9, 2016

(54) PANORAMIC IMAGING SYSTEMS COMPRISING ROTATABLE MIRRORS FOR IMAGE STABILIZATION

(75) Inventors: David Fitzpatrick, Loveland, OH (US); Michael Spicer, Loveland, OH (US)

(73) Assignee: L-3 Communications Cincinnati Electronics Corporation, Mason, OH (US)

(*) Notice: Subject to any disclaimer, the term of this patent is extended or adjusted under 35 U.S.C. 154(b) by 1160 days.

(21) Appl. No.: 13/268,000

(22) Filed: Oct. 7, 2011

(65) Prior Publication Data

US 2013/0088567 A1    Apr. 11, 2013

(51) Int. Cl.
*H04N 7/00* (2011.01)
*G03B 37/02* (2006.01)
*G03B 15/00* (2006.01)

(52) U.S. Cl.
CPC ............ *G03B 37/02* (2013.01); *G03B 15/006* (2013.01); *G03B 2205/0023* (2013.01)

(58) Field of Classification Search
None
See application file for complete search history.

(56) References Cited

U.S. PATENT DOCUMENTS

| | | | |
|---|---|---|---|
| 3,563,146 A | 2/1971 | Miller | |
| 3,916,196 A | 10/1975 | Thompson | |
| 3,959,582 A | 5/1976 | Law et al. | |
| 3,977,793 A | 8/1976 | Trotta | |
| 4,081,207 A | 3/1978 | Dippel | |
| 4,977,323 A | 12/1990 | Jehle | |
| 4,980,565 A | 12/1990 | Jehle | |
| 4,982,092 A * | 1/1991 | Jehle | 250/332 |
| 5,333,076 A | 7/1994 | Wight | |
| 5,338,933 A | 8/1994 | Reeves et al. | |
| 5,373,151 A * | 12/1994 | Eckel et al. | 250/208.1 |
| 5,389,791 A | 2/1995 | Passmore | |
| 5,512,741 A | 4/1996 | Levaillant et al. | |
| 5,663,825 A | 9/1997 | Amon et al. | |
| 6,069,357 A | 5/2000 | Caron et al. | |
| 6,844,912 B2 | 1/2005 | Filous et al. | |
| 6,937,395 B2 | 8/2005 | Hoefft et al. | |
| 2005/0135560 A1* | 6/2005 | Dafni et al. | 378/101 |
| 2005/0195383 A1* | 9/2005 | Breed et al. | 356/4.01 |
| 2008/0175583 A1* | 7/2008 | Seita | 396/357 |
| 2012/0007955 A1* | 1/2012 | Fradenburgh | 348/47 |

* cited by examiner

*Primary Examiner* — Kate Luo
(74) *Attorney, Agent, or Firm* — Dinsmore & Shohl LLP

(57) ABSTRACT

Panoramic imaging systems including rotatable mirrors are provided. A panoramic imaging system includes a rotatable platform, an imaging device mounted to the rotatable platform, and a mirror rotatably mounted to the rotatable platform. The mirror is positioned in an optical path of the imaging device. The mirror and the imaging device are oriented such that the mirror and imaging device are in the same plane, an optical axis of the imaging device is substantially perpendicular to an axis of rotation of the rotatable platform, and an axis of rotation of the mirror is substantially parallel to the axis of rotation of the rotatable platform when the mirror is in an initial position.

20 Claims, 4 Drawing Sheets

PANORAMIC IMAGING SYSTEMS COMPRISING ROTATABLE MIRRORS FOR IMAGE STABILIZATION

TECHNICAL FIELD

Embodiments provided herein generally relate to imaging systems, and more specifically, to panoramic imaging systems comprising rotatable mirrors for image stabilization.

BACKGROUND

In order to provide surveillance and/or situational awareness associated with a stationary or moving object (e.g., in a ground, nautical, or aerial surveillance situation), an imaging system that captures a 360° panoramic view of an area surrounding the object may be desired. An image sensing device (e.g. a CCD image sensor, a CMOS image sensor, a FPA image sensor, etc.) typically has a field of view less than 360°. One way of capturing a 360° panoramic view of a surrounding area is to utilize multiple image sensing devices, positioned so that each image sensing device has a field of view that captures a portion of the 360° panoramic view and that the collective fields of view captured by the image sensing devices encompasses the entire 360° view. Such a system may be costly and complicated.

Another way of capturing a 360° panoramic view of a surrounding area is to utilize a single image sensing device that is rotated about an axis so that the image sensing device captures the entire 360° field of view as it rotates. As the image sensing device rotates, the image it gathers may be blurred because the pixels of the image sensing device may not be exposed to a particular field of view for long enough to generate a stable image.

Accordingly, a need exists for alternative panoramic imaging systems that mitigate image blurring as an image sensing device is rotated about an axis to capture a 360° panoramic view.

SUMMARY

In one embodiment, a panoramic imaging system includes a rotatable platform, an imaging device mounted to the rotatable platform, and a mirror rotatably mounted to the rotatable platform. The mirror is positioned in an optical path of the imaging device. The mirror and the imaging device are oriented such that the mirror and imaging device are in the same plane, an optical axis of the imaging device is substantially perpendicular to an axis of rotation of the rotatable platform, and an axis of rotation of the mirror is substantially parallel to the axis of rotation of the rotatable platform when the mirror is in an initial position.

In another embodiment, a panoramic imaging system includes a rotatable platform and a continuous rotation motor operatively coupled to the rotatable platform. The continuous rotation motor rotates the platform. The panoramic imaging system further includes a rotatable subassembly mounted to the rotatable platform including an imaging device, a lens, and a mirror. The imaging device, the lens, and the mirror are mounted to the rotatable subassembly. The mirror is positioned in an optical path of the lens. The mirror and the imaging device are oriented such that the mirror and imaging device are in the same plane, an optical axis of the imaging device is substantially perpendicular to an axis of rotation of the rotatable platform, and an axis of rotation of the mirror is substantially parallel to the axis of rotation of the rotatable platform when the mirror is in an initial position. The lens is positioned in an optical path of the imaging device.

In yet another embodiment, a panoramic imaging system includes a rotatable platform, an imaging device mounted to the rotatable platform, and a mirror rotatably mounted near an edge of the rotatable platform. The mirror is positioned in an optical path of the imaging device. The mirror and the imaging device are oriented such that the mirror and imaging device are in the same plane, an optical axis of the imaging device is substantially perpendicular to an axis of rotation of the rotatable platform, and an axis of rotation of the mirror is substantially parallel to the axis of rotation of the rotatable platform when the mirror is in an initial position.

DETAILED DESCRIPTION OF THE DRAWINGS

Referring generally to the figures, embodiments described herein are directed to panoramic imaging systems. More specifically, the embodiments described herein include a rotatable platform, an imaging device mounted to the rotatable platform, and a mirror rotatably mounted to the rotatable platform in the optical path of the imaging device. The components of the panoramic imaging system are configured such that the mirror and imaging device are in the same plane, an optical axis of the imaging device is substantially perpendicular to the axis of rotation of the rotatable platform, and an axis of rotation of the mirror is substantially parallel to the axis of rotation of the rotatable platform. By positioning the mirror and imaging device in the same plane, the panoramic imaging system may utilize less coupling optics and/or mirrors. When the rotatable platform rotates, the mirror rotates in the opposite direction in order to allow the imaging device to capture a stable image of a field of view as the imaging device rotates with the rotatable platform. Various embodiments of panoramic imaging systems will be described in more detail herein with specific reference to the corresponding drawings.

Figure 1:
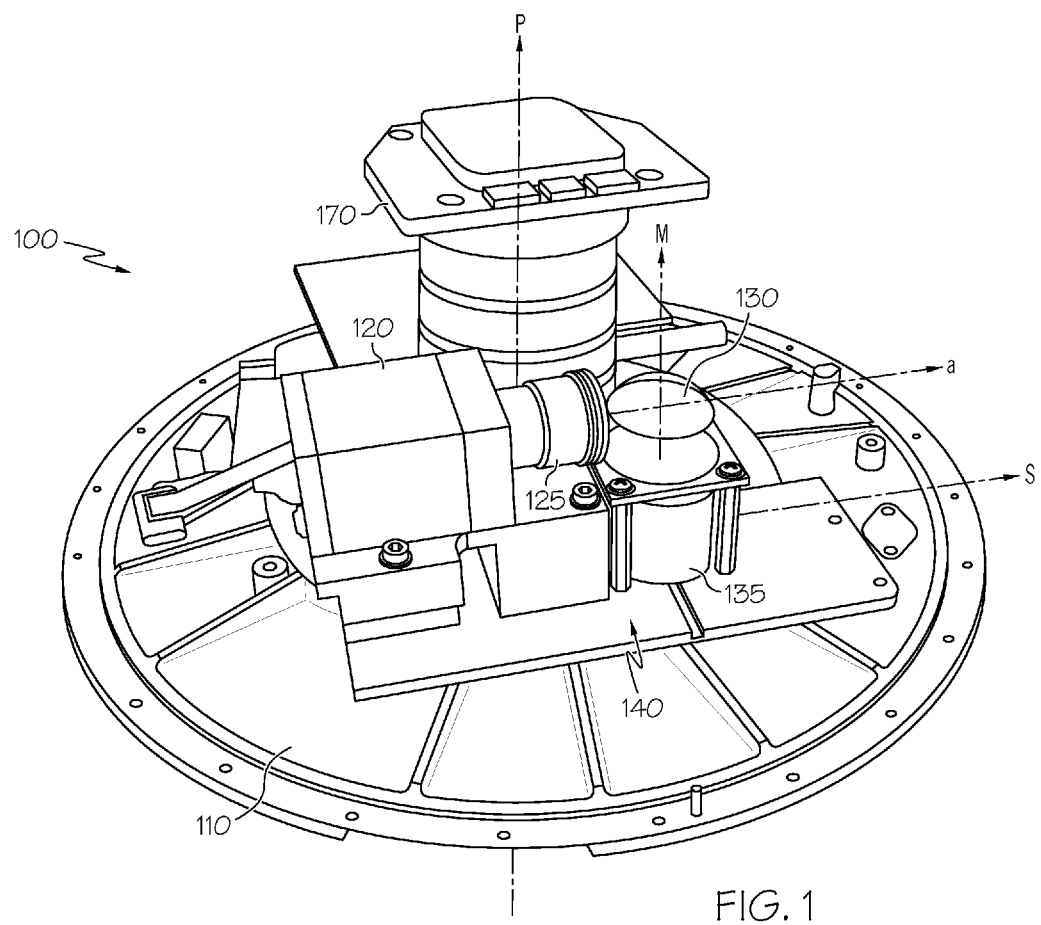
FIG. 1 schematically depicts a perspective view of a panoramic imaging system including an imaging device capable of detecting visible radiation, according to one or more embodiments shown and described herein.

Referring now to the drawings, FIG. 1 depicts a schematic view of a panoramic imaging system 100. The panoramic imaging system 100 generally comprises a rotatable platform 110, a rotatable subassembly 140 mounted to the rotatable platform 110, and a slip ring assembly 170 mounted to the rotatable platform 110. In one embodiment, the panoramic imaging system 100 may further comprise a cover (not shown) that encloses the rotatable platform 110. In such an embodiment, the cover may comprise a window formed in a portion of the sidewall of the cover to allow light to enter the panoramic imaging system 100. In such an embodiment, it should be understood that the shape and size of the cover and the shape, size and location of the window may be tailored to the specific application. For example, the shape, size, and configuration of the cover and the window may depend on the range of elevation imaged by the panoramic imaging system 100 and the configuration and footprint of the components mounted to the rotatable platform 110.

The rotatable subassembly 140 generally comprises an imaging device 120 mounted to a base plate of the rotatable subassembly 140, a lens 125 optically coupled to the imaging device 120, and a scanning mirror assembly. The imaging device 120 may have any resolution and may be configured to detect radiation in an ultraviolet wavelength band, a visible light wavelength band, a near infrared wavelength band, a short-wave infrared wavelength band, a mid-wave infrared wavelength band, or a long-wave infrared wavelength band.

In one embodiment, the imaging device 120 is configured to detect radiation in a visible light wavelength band. For example, in one embodiment, the imaging device 120 is a camera configured to detect visible light, with a resolution of 640 pixels×480 pixels and a frame rate of 60 Hz. In another embodiment, the imaging device 120 is a high definition camera configured to detect visible light, with a resolution of 1440 pixels×1024 pixels and a frame rate of 60 Hz. In yet another embodiment, the imaging device 120 is a high definition camera configured to detect visible light, with a resolution of 1280 pixels×1024 pixels and a frame rate of 60 Hz. However, it should be understood that the imaging device 120 may operate at a frame rate other than 60 Hz and may have resolution other than those stated above.

In other embodiments, the imaging device 120 may be an ultraviolet microchannel plate configured to detect radiation in the ultraviolet wavelength band.

In still other embodiments, the imaging device 120 may be an infrared camera configured to detect radiation in an infrared wavelength band. The infrared camera may be configured to detect radiation in a near infrared wavelength band, a shortwave-infrared wavelength band, a midwave-infrared wavelength band, and/or a long-wave infrared wavelength band. The infrared camera may comprise an infrared focal plane array, e.g., an infrared focal plane array housed within a dewar flask for cooling the infrared focal plane array. In one embodiment, the infrared camera may have a resolution of 1280 pixels×1024 pixels and have a frame rate of 60 Hz. However, it should be understood that the infrared camera may operate at a frame rate other than 60 Hz and may have a resolution other than 1280 pixels×1024 pixels.

Still referring to FIG. 1, the scanning mirror assembly of the rotatable subassembly 140 comprises a scanning mirror motor 135 mounted to the rotatable subassembly 140 and a scanning mirror 130 affixed to a drive shaft (not shown) of the scanning mirror motor 135. The scanning mirror 130 is positioned in the optical path of the imaging device 120. As shown in FIG. 1, the scanning mirror 130 and the imaging device 120 are in the same plane.

The scanning mirror 130 may be positioned such that, when the scanning mirror 130 is in a neutral position, a face of the scanning mirror 130 is oriented at an angle of about 45° relative to an optical axis a of the imaging device 120. However, it should be understood that in other embodiments, the angle at which the face of the scanning mirror 130 is oriented relative to the optical axis of the imaging device 120 may be different from 45°.

The slip ring assembly 170 permits wires (or any other electrical or optical transmission medium) to exit through the bottom of the rotatable platform 110. The wires may generally allow the components that are mounted on and rotate with the rotatable platform 110 (e.g., the imaging device 120, the scanning mirror motor 135, and a motor that controls the rotation of the rotatable subassembly 140) to transmit data and control signals to and from one or more computing devices and/or hardware devices external to the rotatable platform 110, such as below the rotatable platform 110. While the embodiment depicted in FIG. 1 includes wires that permit the components mounted on the rotatable platform 110 to communicate with components external to the rotatable platform 110, in other embodiments, the components mounted on the rotatable platform 110 may communicate wirelessly with the components external to the rotatable platform 110.

In operation, a rotatable platform motor, such as a continuous rotation motor, (not shown) rotates the rotatable platform 110 about an axis of rotation p. The rotatable platform 110 may rotate in a first direction. In one embodiment, the rotatable platform 110 may rotate at about 900° per second; however, it should be understood that in other embodiments, the rotatable platform 110 may rotate faster or slower, depending on the particular application.

It should be noted that the field of view of the lens 125 is typically related to the rotation rate of the rotatable platform 110 and the frame rate of the imaging device 120. The field of view of the lens 125 is typically the quotient of the rotation rate of the rotatable platform 110 and the frame rate of the imaging device 120. For example, in an embodiment in which the rotatable platform 110 rotates at 900°/sec and the imaging device has a frame rate of 60 Hz, the field of view of the camera may be 900°/sec divided by 60 Hz, which equals 15°. In some embodiments, the field of view of the lens 125 may be greater than the quotient of the rotation rate of the rotatable platform 110 and the frame rate of the imaging device 120 to allow for overlapping neighboring fields of view so that successive fields of view may be stitched together to form a panoramic image. For example, in an embodiment in which the rotatable platform 110 rotates at 900°/sec and the imaging device has a frame rate of 60 Hz, the field of view of the camera may be 17°, which represents the 900°/sec rotation rate of the rotatable platform 110 divided by the 60 Hz frame rate of the imaging device 120, plus an additional 1° overlap added to each side of the field of view so that successive fields of view may be stitched together to form a panoramic image.

As the rotatable platform 110 rotates in the first direction, the scanning mirror motor 135 may rotate the scanning mirror 130 about an axis of rotation m in a second direction, opposite the first direction of the rotatable platform 110 for a duration long enough such that the imaging device is exposed to a fixed field of view for a duration long enough to enable the imaging device 120 to form a stable image of the field of view. The scanning mirror 130 typically rotates at a rate about the same as the rate at which the rotatable platform 110 rotates, though the scanning mirror 130 may rotate at a different rate than the rotatable platform 110. In the embodiment depicted in FIG. 1, in which the panoramic imaging system 100 is scanning at 0° elevation, the axis of rotation m of the scanning mirror 130 is substantially parallel to the axis of rotation p of the rotatable platform. In some embodiments, the axis of rotation m of the scanning mirror 130 is located radially outward of the center of the rotatable platform 110, while in other embodiments, the axis rotation m of the scanning mirror 130 and the axis of rotation p of the rotatable platform 110 are the same.

Once the imaging device 120 has been exposed to the fixed field of view for a duration long enough to enable the imaging device 120 to form a stable image of the field of view, the scanning mirror motor 135 rotates the scanning mirror 130 in the first direction such that the scanning mirror 130 snaps back to an initial position, thereby exposing the imaging device 120 to the next field of view.

The panoramic imaging system 100 may scan at an elevation angle other than 0° (the elevation angle at which the embodiment depicted in FIG. 1 is configured to scan). In order to change the elevation of the field of view to which the imaging device 120 is exposed, the rotatable subassembly 140 may rotate about an axis of rotation s. In the embodiment depicted in FIG. 1, the axis of rotation s of the rotatable subassembly 140 is substantially parallel to the optical axis a of the imaging device 120 and is substantially perpendicular to the axis of rotation p of the rotatable platform 110. However, it should be understood that in other embodiments, the rotatable subassembly 140 may tilt up and down instead of rotate about the axis of rotation s (i.e., about an axis of rotation that is perpendicular to the optical axis a and parallel to the rotatable platform 110).

While the embodiment depicted in FIG. 1 comprises a rotatable subassembly 140 that permits changing the elevation angle imaged by the panoramic imaging system 100, in other embodiments, the panoramic imaging system 100 may not include the rotatable subassembly 140. In such embodiments, the scanning mirror motor 135 and the imaging device 120 may be mounted directly to the rotatable platform 110. In such embodiments, the panoramic imaging system 100 may only scan at a fixed elevation angle. In one embodiment, the fixed elevation angle may be about 0°. In another embodiment, the fixed elevation angle may be in the range from about −10° to about 45°. Further, it should be understood that the fixed elevation angle may depend on the particular application. For example, when the panoramic imaging system 100 is used in a nautical application, the fixed elevation angle may be in the range from about −10° to about 0°. When the panoramic imaging system 100 is used in an aerial application, the fixed elevation angle may be in the range from about 0° to 45°.

Figure 2:
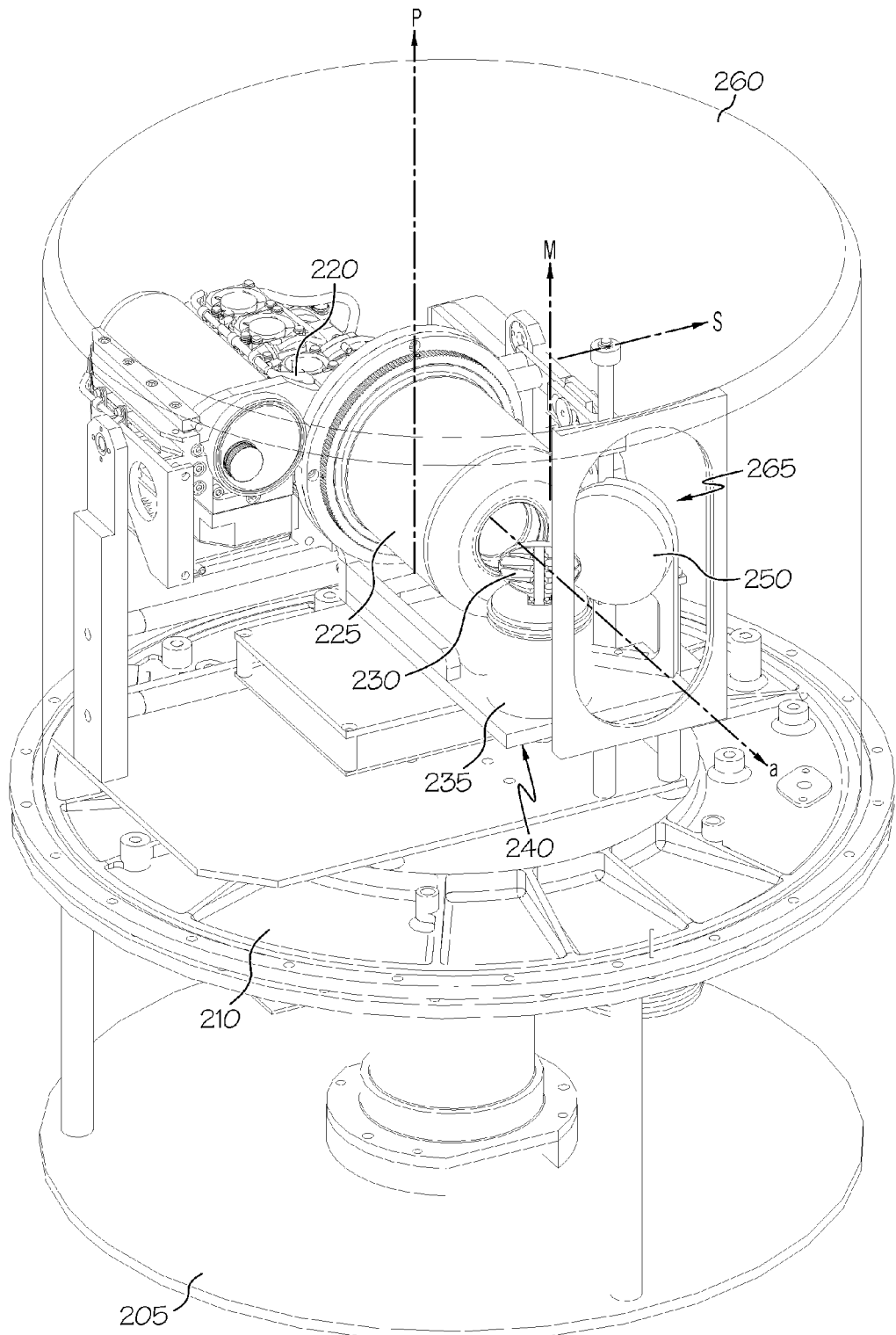
FIG. 2 schematically depicts a perspective view of a panoramic imaging system including an imaging device capable of detecting infrared radiation, according to one or more embodiments shown and described herein.

Referring now to FIG. 2, a schematic view of an infrared panoramic imaging system 200 of another embodiment is schematically depicted. The infrared panoramic imaging system 200 generally comprises a fixed platform 205, a rotatable platform 210, a rotatable subassembly 240 mounted to the rotatable platform 210, and a cover 260 comprising a window 265. The cover 260, which is illustrated as transparent to depict the interior components, encloses the rotatable platform 210. A window 265 is formed in a portion of the sidewall of the cover 260 to allow light to enter the infrared panoramic imaging system 200. It should be understood that the shape and size of the cover 260 and the shape, size and location of the window 265 may be tailored to the specific application. For example, the shape, size, and configuration of the cover 260 and the window 265 may depend on the range of elevation imaged by the infrared panoramic imaging system 200 and the configuration and footprint of the components mounted to the rotatable platform 210. While the embodiment depicted in FIG. 2 comprises the cover 260, other embodiments may not include the cover 260.

The rotatable subassembly 240 comprises an imaging device 220 mounted to a base plate of the rotatable subassembly 240, a lens 225 optically coupled to the imaging device 220, a scanning mirror assembly, and a folding mirror 250. The folding mirror 250 may be positioned in the optical path of the scanning mirror assembly. While the embodiment depicted in FIG. 2 includes one folding mirror, other embodiments may include more than one folding mirror or, alternatively, may not have a folding mirror.

The imaging device 220 may have any resolution and may be configured to detect radiation in an ultraviolet wavelength band, a visible light wavelength band, a near infrared wavelength band, a short-wave infrared wavelength band, a mid-wave infrared wavelength band, or a long-wave infrared wavelength band.

In one embodiment, the imaging device 220 may be an infrared camera configured to detect radiation in an infrared wavelength band. The infrared camera may be configured to detect radiation in a near infrared wavelength band, a short-wave-infrared wavelength band, a midwave-infrared wavelength band, and/or a long-wave infrared wavelength band. The infrared camera may comprise an infrared focal plane array, e.g., an infrared focal plane array housed within a cooled dewar flask. In one embodiment, the infrared camera may have a resolution of 1280 pixels×1024 pixels and have a frame rate of 60 Hz. However, it should be understood that the infrared camera may operate at a frame rate other than 60 Hz and may have a resolution other than 1280 pixels×1024 pixels.

In other embodiments, the imaging device 220 may be an ultraviolet microchannel plate configured to detect radiation in the ultraviolet wavelength band.

In still other embodiments, the imaging device 220 may be configured to detect radiation in a visible light band. For example, in one embodiment, the imaging device 220 is a camera configured to detect visible light, with a resolution of 640 pixels×480 pixels and a frame rate of 60 Hz. In another embodiment, the imaging device 220 is a high definition camera configured to detect visible light, with a resolution of 1440 pixels×1024 pixels and a frame rate of 60 Hz. In yet another embodiment, the imaging device 220 is a high definition camera configured to detect visible light, with a resolution of 1280 pixels×1024 pixels and a frame rate of 60 Hz. However, it should be understood that the imaging device 220 may operate at a frame rate other than 60 Hz and may have a resolution other than those stated above.

Still referring to FIG. 2, the scanning mirror assembly of the rotatable subassembly 240 generally comprises a scanning mirror motor 235 mounted to the rotatable subassembly 240 and a scanning mirror 230 affixed to a drive shaft (not shown) of the scanning mirror motor 235. The scanning mirror 230 is positioned in the optical path of the imaging device 220. As shown in FIG. 2, the scanning mirror 230 and the imaging device 220 are in the same plane.

The scanning mirror 230 may be positioned such that, when the scanning mirror 230 is in a neutral position, a face of the scanning mirror 230 is oriented at an angle of about 45° relative to an optical axis a of the imaging device 220. However, it should be understood that in other embodiments, the angle at which the face of the scanning mirror 230 is oriented relative to the optical axis a of the imaging device 220 may be different from 45°.

Still referring to FIG. 2, the infrared panoramic imaging system 200 may further comprise a slip ring assembly (not shown) that permits wires (or any other electrical or optical transmission medium) to exit through the bottom of the rotatable platform 210. The wires may generally allow the components that are mounted on and rotate with the rotatable platform 210 (e.g., the imaging device 220, the scanning mirror motor 235, and a motor that controls the rotation of the rotatable subassembly 240) to transmit data and control signals to and from one or more computing devices and/or hardware devices external to the mounting platform. While the embodiment depicted in FIG. 2 includes wires that permit the components mounted on the rotatable platform 210 to communicate with components external to the rotatable platform 210, in other embodiments, the components mounted on the rotatable platform 210 may communicate wirelessly with the components external to the rotatable platform 210.

In operation, a rotatable platform motor, such as a continuous rotation motor, (not shown) rotates the rotatable platform 210 about an axis of rotation p. The rotatable platform 210 may rotate in a first direction. In one embodiment, the rotatable platform 210 may rotate at about 900° per second; however, it should be understood that in other embodiments, the rotatable platform 210 may rotate faster or slower, depending on the particular application.

As stated above with respect to the embodiment illustrated in FIG. 1, the field of view of the lens 225 is typically related to the rotation rate of the rotatable platform 210 and the frame rate of the imaging device 220. The field of view of the lens 225 is typically the quotient of the rotation rate of the rotatable platform 210 and the frame rate of the imaging device 220. For example, in an embodiment in which the rotatable platform 210 rotates at 900°/sec and the imaging device has a frame rate of 60 Hz, the field of view of the camera may be 900°/sec divided by 60 Hz, which equals 15°. In some embodiments, the field of view of the lens 225 may be greater than the quotient of the rotation rate of the rotatable platform 210 and the frame rate of the imaging device 220 to allow for overlapping neighboring fields of view so that successive fields of view may be stitched together to form a panoramic image. For example, in an embodiment in which the rotatable platform 210 rotates at 900°/sec and the imaging device has a frame rate of 60 Hz, the field of view of the camera may be 17°, which represents the 900°/sec rotation rate of the rotatable platform 210 divided by the 60 Hz frame rate of the imaging device 220, plus an additional 1° overlap added to each side of the field of view so that successive fields of view may be stitched together to form a panoramic image.

As the rotatable platform 210 rotates in the first direction, the scanning mirror motor 235 may rotate the scanning mirror 230 about an axis of rotation m in a second direction, opposite the first direction of the rotatable platform 210 for a duration long enough such that the imaging device is exposed to a fixed field of view for a duration long enough to enable the imaging device 220 to form a stable image of the field of view. The scanning mirror 230 typically rotates at a rate about the same as the rate at which the rotatable platform 210 rotates, though the scanning mirror 230 may rotate at a different rate than the rotatable platform 210. In the embodiment depicted in FIG. 2, in which the infrared panoramic imaging system 200 is scanning at 0° elevation, the axis of rotation m of the scanning mirror 230 is substantially parallel to the axis of rotation p of the rotatable platform 210. In some embodiments, the axis of rotation m of the scanning mirror 230 is located radially outward of the center of the rotatable platform 210, while in other embodiments, the axis rotation m of the scanning mirror 230 and the axis of rotation p of the rotatable platform 210 are the same.

Once the imaging device 220 has been exposed to the fixed field of view for a duration long enough to enable the imaging device 220 to form a stable image of the field of view, the scanning mirror motor 235 rotates the scanning mirror 230 in the first direction such that the scanning mirror 230 snaps back to an initial position, thereby exposing the imaging device 220 to the next field of view.

The infrared panoramic imaging system 200 may scan at an elevation angle other than 0° (the elevation angle at which the embodiment depicted in FIG. 2 is configured to scan). In order to change the elevation of the field of view to which the imaging device 220 is exposed, the rotatable subassembly 240 may pivot up and down about an axis of rotation s. In other embodiments, the axis of rotation s of the rotatable subassembly 240 may be substantially parallel to the optical axis a of the imaging device 220 and substantially perpendicular to the axis of rotation p of the rotatable platform 210.

While the embodiment depicted in FIG. 2 comprises a rotatable subassembly 240 that permits changing the elevation angle imaged by the infrared panoramic imaging system 200, in other embodiments, the infrared panoramic imaging system 200 does not include the rotatable subassembly 240. In such embodiments, the scanning mirror motor 235 and the imaging device 220 may be mounted directly to the rotatable platform 210. In such embodiments, the infrared panoramic imaging system 200 may only scan at a fixed elevation angle. In one embodiment, the fixed elevation angle may be about 0°. In another embodiment, the fixed elevation angle may be in the range from about −10° to about 45°. Further, it should be understood that the fixed elevation angle may depend on the particular application. For example, when the infrared panoramic imaging system 200 is used in a nautical application, the fixed elevation angle may be in the range from about −10° to about 0°. When the infrared panoramic imaging system 200 is used in an aerial application, the fixed elevation angle may be in the range from about 0° to 45°.

Figure 3:
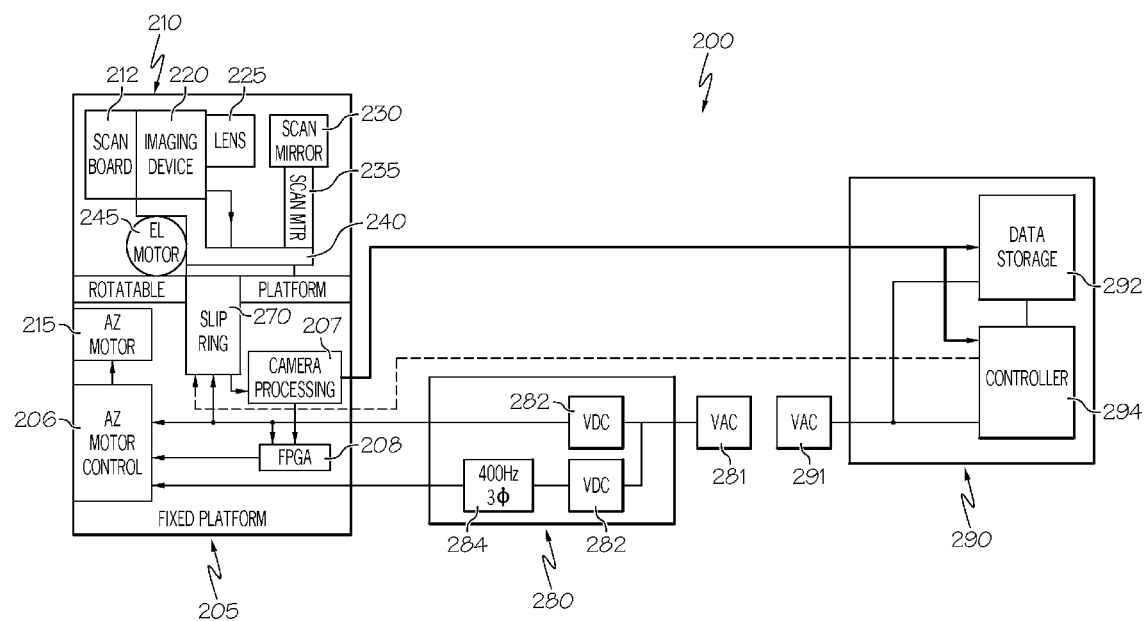
FIG. 3 schematically depicts a block diagram illustrating the interrelationship of the various components of the panoramic imaging system of FIG. 2, according to one or more embodiments shown and described herein.

Referring now to FIG. 3, a block diagram illustrating the interrelationship of the various components of the infrared panoramic imaging system 200 of FIG. 2 is schematically depicted. The infrared panoramic imaging system 200 comprises a fixed platform 205, a rotatable platform 210, a slip ring assembly 270, a power supply module 280, and a system interface module 290. The slip ring assembly 270 allows wires to pass between the rotatable platform 210 and the fixed platform 205, thereby allowing components mounted to the rotatable platform 210 to communicate with components mounted to the fixed platform 205.

The fixed platform 205 may comprise an azimuth motor 215, an azimuth motor controller 206, a camera processing module 207, and a field programmable gate array 208.

The rotatable platform 210 may comprise an elevation motor 245 and the rotatable subassembly 240. The rotatable subassembly 240 comprises a scan board 212, the imaging device 220, the lens 225, the scanning mirror 230, and the scanning mirror motor 235.

In the embodiment illustrated in FIG. 3, the power supply module 280 comprises a DC power supply module 282 and an AC power supply module 284. The DC power supply module 282 may convert power from an external power source 281 (e.g., a 110 VAC power source) to DC power (e.g., 28 VDC). The power output by the DC power supply module 282 may be supplied to components on the fixed platform 205 (e.g., the azimuth motor controller 206, the azimuth motor 215, and the field programmable gate array 208) and to components on the rotatable platform 210 via the slip ring assembly 270. The AC power supply module 284 may comprise an inverter that inverts 28 VDC power into a 400 Hz three-phase power output. The AC power supply module 284 may supply power to the azimuth motor controller 206 and the azimuth motor 215.

The system interface module 290, which may receive power from an external power source 291, may have a data storage module 292 and a controller module 294. The data storage module 292 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components.

The controller module 294 may be configured as a general purpose computing device with the requisite hardware, software, and/or firmware, or as a special purpose computing device designed specifically for performing the functionality described herein. The controller module 294 may include a processor, input/output hardware, network interface hardware, a data storage component, and a non-transitory memory component. The memory component may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. A local interface is also included in the controller module 294 and may be implemented as a bus or other interface to facilitate communication among the components of the controller module 294. The processor may include any processing component configured to receive and execute computer readable code instructions. The input/output hardware may include a graphics display device, keyboard, mouse, printer, camera, microphone, speaker, touch-screen, and/or other device for receiving, sending, and/or presenting data. The network interface hardware may include any wired or wireless networking hardware, such as a modem, LAN port, wireless fidelity (Wi-Fi) card, WiMax card, mobile communications hardware, and/or other hardware for communicating with other networks and/or devices.

In operation, the controller module 294 of the system interface module 290 may control the camera processing module 207, the field programmable gate array 208, the elevation motor 245, the imaging device 220, and the scanning mirror motor 235. The field programmable gate array 208 may interface with the azimuth motor controller 206, which in turn controls the azimuth motor 215. In one embodiment, a digital logic level pulse (generated outside the imaging device 220) may be used to trigger the imaging device 220 and the scanning mirror motor 235. In one embodiment, the leading edge of the trigger pulse may trigger the scanning mirror motor 235 and the trailing edge of the trigger pulse may trigger the imaging device 220. A delay may be introduced to the trigger pulses in order to center a target that would otherwise overlap two fields of view into a single field of view.

The data output by the imaging device 220 may be transmitted to the camera processing module 207 of the fixed platform 205 through the slip ring assembly 270. The camera processing module 207 may process the received image data and transmit it to the data storage module 292. The data output by the imaging device 220 may also be transmitted to the controller module 294. Each image transmitted by the imaging device 220 typically corresponds to a field of view of the camera. A panoramic image of the full 360° area scanned by the imaging device 220 can be constructed from the successive fields of view transmitted by the imaging device 220. The received images may be displayed on the controller module 294 (e.g., on a computer monitor or a heads-up displayed at a time) so that only one field of view is displayed at a time. Alternatively, the received images may be displayed on the controller module 294 in a panoramic view by stitching together successive fields of view.

Referring now to FIGS. 4A-4D, several configurations of an imaging device 420, a lens 425, a scanning mirror motor 435, a scanning mirror 430, and an optional folding mirror 450, are schematically depicted when positioned on a rotatable platform 410.

Figure 4A:
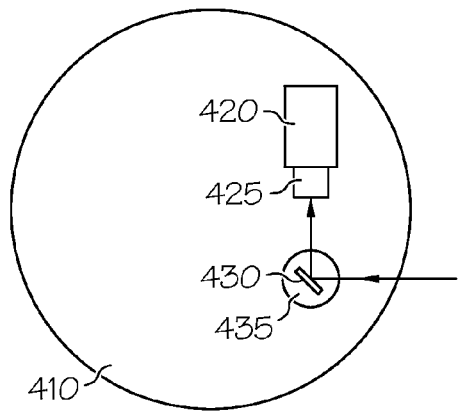
FIG. 4A schematically depicts a first configuration of an imaging device, a lens, and a rotatable mirror on a rotatable platform, according to one or more embodiments shown and described herein.

In the embodiment depicted in FIG. 4A, the imaging device 420 is positioned near an edge of the rotatable platform 410 and is oriented such that an optical axis of the imaging device 420 extends along the edge. A scanning mirror 430 mounted to a scanning mirror motor 435 is positioned near an edge of the rotatable platform 410 in the optical path of the imaging device 420. As the scanning mirror 430 is oriented at about a 45° angle relative to the optical axis of the imaging device 420 in the embodiment depicted in FIG. 4A, light may reflect off the scanning mirror 430, pass through the lens 425, and be detected by the imaging device 420. By positioning the scanning mirror 430 near the edge of the rotatable platform 410, motion parallax may be mitigated. The importance of mitigating motion parallax may depend on the relative speed of the objects being imaged. For example, in an aerial application, in which the relative speed of an object to be imaged may be high, it may not be important to mitigate motion parallax. In contrast, in a nautical application, in which the relative speed of an object to be imaged may be low, it may be more important to mitigate motion parallax.

Figure 4B:
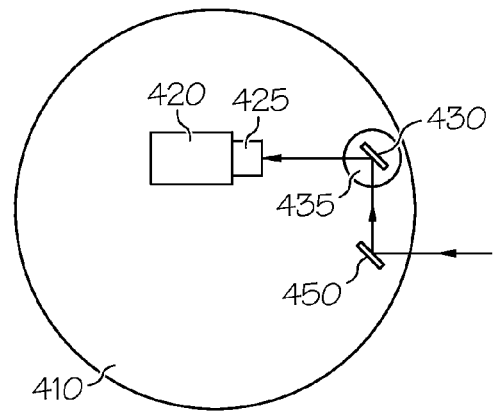
FIG. 4B schematically depicts a configuration of an imaging device, a lens, a rotatable mirror, and a folding mirror mounted on a rotatable platform, according to one or more embodiments shown and described herein.

In the embodiment depicted in FIG. 4B, the imaging device 420 is positioned near a center of the rotatable platform 410 and is oriented such that an optical axis of the imaging device 420 extends through the rotatable platform 410. A scanning mirror 430 mounted to a scanning mirror motor 435 is positioned near an edge of the rotatable platform 410 in the optical path of the imaging device 420. A folding mirror 450 is positioned near the same edge as the scanning mirror 430, such that the folding mirror 450 is in the optical path of the imaging device 420 and the scanning mirror 430. Light may reflect off the folding mirror 450, reflect off the scanning mirror 430, pass through the lens 425, and be detected by the imaging device 420. By positioning the scanning mirror 430 and the folding mirror 450 near the edge of the rotatable platform 410, motion parallax may be mitigated.

Figure 4C:
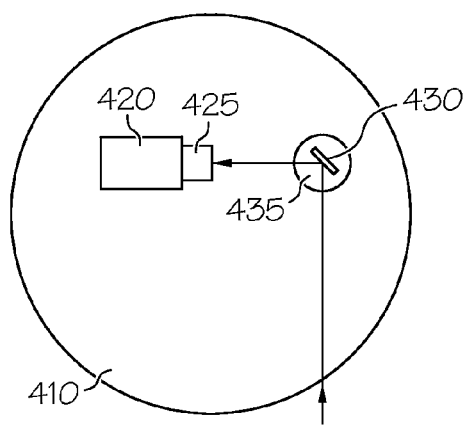
FIG. 4C schematically depicts another configuration of an imaging device, a lens, and a rotatable mirror on a rotatable platform, according to one or more embodiments shown and described herein.

In the embodiment depicted in FIG. 4C, the imaging device 420 is positioned near a center of the rotatable platform 410 and is oriented such that an optical axis of the imaging device 420 extends through the rotatable platform 410. A scanning mirror 430 mounted to a scanning mirror motor 435 is positioned near an edge of the rotatable platform 410 in the optical path of the imaging device 420. As the scanning mirror 430 is oriented at about a 45° angle relative to the optical axis of the imaging device 420 in the embodiment depicted in FIG. 4C, light may reflect off the scanning mirror 430, pass through the lens 425, and be detected by the imaging device 420. By positioning the scanning mirror 430 near the edge of the rotatable platform 410, motion parallax may be mitigated.

Figure 4D:
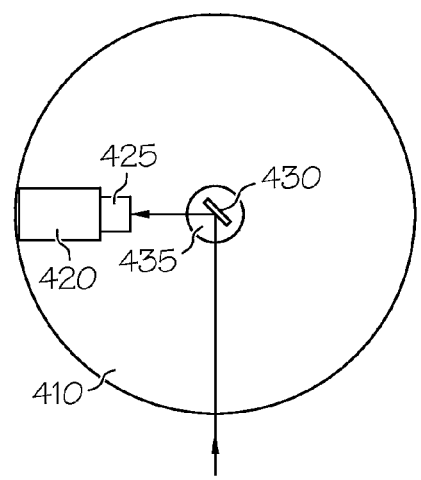
FIG. 4D schematically depicts yet another configuration of an imaging device, a lens, and a rotatable mirror on a rotatable platform, according to one or more embodiments shown and described herein.

In the embodiment depicted in FIG. 4D, the imaging device 420 is positioned near an edge of the rotatable platform 410 and is oriented such that an optical axis of the imaging device 420 is directed towards a center of the rotatable platform 410. A scanning mirror 430 mounted to a scanning mirror motor 435 is positioned in the center of the rotatable platform 410 in the optical path of the imaging device 420. As the scanning mirror 430 is oriented at about a 45° angle relative to the optical axis of the imaging device 420 in the embodiment depicted in FIG. 4D, light may reflect off the scanning mirror 430, pass through the lens 425, and be detected by the imaging device 420.

The configurations depicted in FIG. 4 are merely exemplary and are not intended to limit the scope of this disclosure.

Many other alternative configurations of the imaging device 420, the lens 425, the scanning mirror 430, and one or more folding mirror 450 are possible.

It should now be understood that the configuration and distribution of the various components of the infrared panoramic imaging system 200 illustrated in FIG. 3 are merely exemplary and are not intended to limit the scope of this disclosure. More specifically, alternative distributions of the components among the rotatable platform 210, the fixed platform 205, the power supply module 280, and the system interface module 290 are possible.

While the embodiments described herein utilize physical rotation of a scanning mirror in the optical path of an imaging device to stabilize an image as the imaging device rotates, embodiments are not limited thereto. For example, image blurring of a rotating imaging device can also be avoided by electro-optical deflection through non-linear material, acousto-optical deflection through non-linear material, and micro-mirror deflection.

It should now be understood that panoramic imaging systems as described herein minimize image blurring as an imaging device is rotated about an axis to capture successive images that collectively form a 360° panoramic view. In order to minimize image blurring as the image sensing device rotates, a rotatable mirror in the optical path of the imaging device rotates so that the field of view that the imaging device is exposed to is fixed for a sufficient time for the imaging device to capture a stable image. Further, by positioning the mirror and imaging device in the same plane, the panoramic imaging system may utilize less coupling optics and/or mirrors.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A panoramic imaging system comprising:
   a rotatable platform;
   an imaging device mounted to the rotatable platform;
   a reflective mirror rotatably mounted to the rotatable platform, wherein the reflective mirror is positioned in an optical path of the imaging device, wherein:
   the reflective mirror and the imaging device are oriented such that a plane that is perpendicular to an axis of rotation of the reflective mirror both intersects the reflective mirror and includes an optical axis of the imaging device, the optical axis of the imaging device is substantially perpendicular to an axis of rotation of the rotatable platform, and the axis of rotation of the reflective mirror is substantially parallel to the axis of rotation of the rotatable platform when the reflective mirror is in an initial position.

2. The panoramic imaging system of claim 1, further comprising a rotatable subassembly for varying the axis of rotation of the reflective mirror relative to the axis of rotation of the rotatable platform, wherein:
   the imaging device and the reflective mirror are mounted to the rotatable subassembly; and
   the rotatable subassembly is mounted to the rotatable platform.

3. The panoramic imaging system of claim 2, wherein an axis of rotation of the rotatable subassembly is substantially parallel to the optical axis of the imaging device.

4. The panoramic imaging system of claim 2, wherein an axis of rotation of the rotatable subassembly is perpendicular to the optical axis of the imaging device.

5. The panoramic imaging system of claim 1, further comprising a continuous rotation motor operatively coupled to the rotatable platform, wherein the continuous rotation motor rotates the platform.

6. The panoramic imaging system of claim 1, wherein the reflective mirror has a neutral position about 45 degrees from the optical axis of the imaging device.

7. The panoramic imaging system of claim 1, further comprising a folding mirror mounted to the rotatable platform, wherein the folding mirror is positioned in the optical path of the reflective mirror and the imaging device.

8. The panoramic imaging system of claim 1, wherein the axis of rotation of the reflective mirror is located radially outward from a center of the rotatable platform.

9. The panoramic imaging system of claim 1, wherein the imaging device comprises a camera capable of detecting radiation in a visible light wavelength band.

10. The panoramic imaging system of claim 1, wherein the imaging device comprises an infrared focal plane array capable of detecting radiation in a shortwave-infrared wavelength band, a midwave-infrared wavelength band, or a longwave infrared wavelength band.

11. The panoramic imaging system of claim 1, wherein the imaging device comprises an infrared focal plane array housed within a dewar flask for cooling the infrared focal plane array.

12. The panoramic imaging system of claim 1, wherein the imaging device comprises an ultraviolet microchannel plate capable of detecting radiation in the ultraviolet wavelength band.

13. The panoramic imaging system of claim 1, further comprising a slip ring assembly to enable the transfer of imaging data to a computing device external to the rotatable platform.

14. The panoramic imaging system of claim 1, further comprising a lens positioned between the imaging device and the reflective mirror, wherein the lens is positioned in the optical path of the imaging device.

15. A panoramic imaging system comprising:
   a rotatable platform;
   a continuous rotation motor operatively coupled to the rotatable platform, wherein the continuous rotation motor rotates the platform;
   a rotatable subassembly mounted to the rotatable platform comprising an imaging device, a lens, and a reflective mirror, wherein:
   the imaging device, the lens, and the reflective mirror are mounted to the rotatable subassembly;
   the reflective mirror is positioned in an optical path of the lens; and
   the reflective mirror and the imaging device are oriented such that a plane that is perpendicular to an axis of rotation of the reflective mirror both intersects the reflective mirror and includes an optical axis of the imaging device, the optical axis of the imaging device is substantially perpendicular to an axis of rotation of the rotatable platform and the axis of rotation of the reflective mirror is substantially parallel to the axis of rotation of the rotatable platform when the reflective mirror is in an initial position; and the lens is positioned in an optical path of the imaging device.

16. The panoramic imaging system of claim 15, further comprising a folding mirror mounted to the rotatable platform, wherein the folding mirror is positioned in the optical path of the reflective mirror and the imaging device.

17. The panoramic imaging system of claim 15, further comprising a slip ring assembly.

18. A panoramic imaging system comprising:
a rotatable platform;
an imaging device mounted to the rotatable platform;
a reflective mirror rotatably mounted near an edge of the rotatable platform, wherein the reflective mirror is positioned in an optical path of the imaging device, wherein:

the reflective mirror and the imaging device are oriented such that a plane that is perpendicular to an axis of rotation of the reflective mirror both intersects the reflective mirror and includes an optical axis of the imaging device, the optical axis of the imaging device is substantially perpendicular to an axis of rotation of the rotatable platform, and the axis of rotation of the reflective mirror is substantially parallel to the axis of rotation of the rotatable platform when the reflective mirror is in an initial position.

19. The panoramic imaging system of claim 18, further comprising a folding mirror mounted to the rotatable platform, wherein the folding mirror is positioned in the optical path of the reflective mirror and the imaging device.

20. The panoramic imaging system of claim 18, further comprising a continuous rotation motor operatively coupled to the rotatable platform, wherein the continuous rotation motor rotates the platform.

* * * * *